United States Patent [19]

Nugent

[11] Patent Number: 4,529,278
[45] Date of Patent: Jul. 16, 1985

[54] PORTABLE CHILDREN'S MIRROR

[76] Inventor: Robert T. Nugent, 38 Jefferson St., Scarsdale, N.Y. 10583

[21] Appl. No.: 521,530

[22] Filed: Aug. 9, 1983

[51] Int. Cl.³ ................................................. G02B 5/08
[52] U.S. Cl. ....................................... 350/631; 248/467
[58] Field of Search ........................... 350/288; 248/467

[56]  References Cited
U.S. PATENT DOCUMENTS

| | | | |
|---|---|---|---|
| 2,668,477 | 2/1954 | Shaikun | 248/467 |
| 2,856,814 | 10/1958 | Dillmann | 248/467 |
| 2,968,995 | 1/1961 | Holden | 248/467 |
| 3,708,218 | 1/1973 | Smillie | 248/467 |

Primary Examiner—Jon W. Henry
Attorney, Agent, or Firm—Kenyon & Kenyon

[57] ABSTRACT

The invention relates to a mirror which is both easy to mount and dismount to allow for ready transfer of the mirror from place to place is highly resistant to impact damage, so that it is safe and easy for a child to use or play with, and provides a surface for decorative or informational material. All parts are made of plastic and the mounting means consists of suction cups which are easy for a child to use in order to put up or take down the mirror. The lightness of the materials also make the mirror appropriate for use by a small child without any danger of droppage or breakage.

3 Claims, 3 Drawing Figures

PORTABLE CHILDREN'S MIRROR

BRIEF DISCLOSURE OF THE INVENTION

This invention relates to a mirror which is constructed from materials which are safe for children to handle and which is provided with a system for mounting the mirror on a wall which is both simple enough for a child to use and capable of repeated use. It also provides a convenient area for messages or decorations to be mounted so that they can be seen at a glance.

In the past, mirrors were considered too dangerous to allow children to play with in an unsupervised environment. The danger arose from the construction of mirrors from glass—a material highly susceptible to breakage when handled roughly. With the advent of modern plastic technology, it is possible to make a mirror from a plastic material that would have all the qualities of a mirror except for its fragility. These modern materials are highly resistive to impact and are very unlikely to shatter into numerous small, sharp lethal missles under rough handling by a child. By adding to a mirror made from such shatter-resistant material, means by which the mounting of the mirror on a wall surface is rendered simple enough for a child to accomplish and which, in addition, allows for easy removal of the mirror from one place and immediate remounting in another place, one has produced an ideal mirror to be given to a child for his or her own use without close supervision from an adult. The use of plastic also provides a surface where messages or decorations can readily be mounted for repeated viewings.

Therefore, it is an object of the present invention to provide a mirror suitable for use by a child that is safe for a child to handle is easy to mount on and dismount from a wall, and which provides a surface for mounting messages or decorations.

BRIEF DESCRIPTION OF THE DRAWING

The foregoing and other objects, features and advantages of the invention will be apparent from the following more particular description of the preferred embodiment of the invention. This is illustrated in the accompanying drawings, wherein.

DETAILED DESCRIPTION OF THE INVENTION

Figure 1:
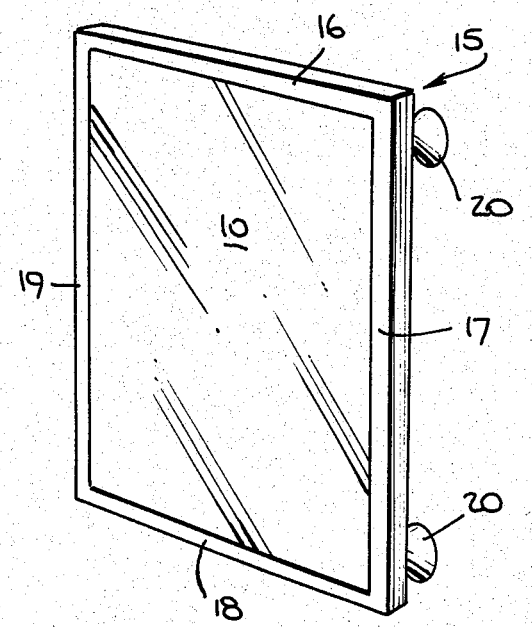
FIG. 1 is a side elevational view of a preferred embodiment of the invention.
Figure 2:
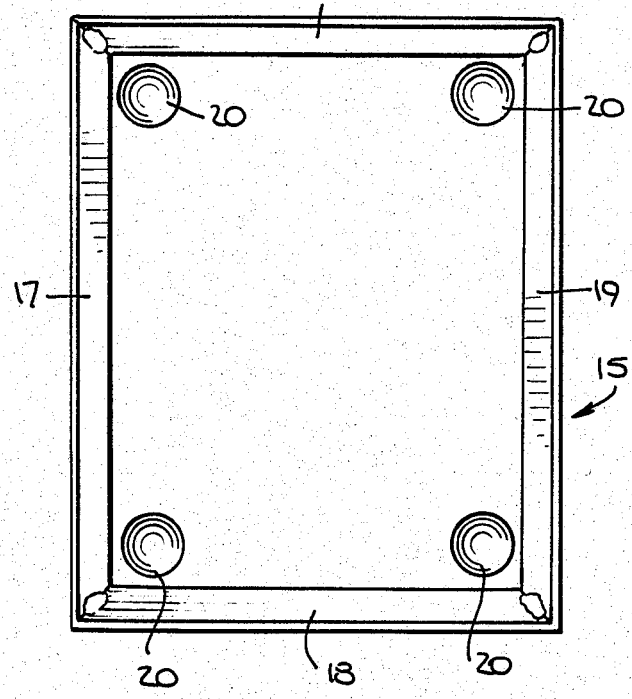
FIG. 2 is a rear view of a preferred embodiment of the invention.
Figure 3:
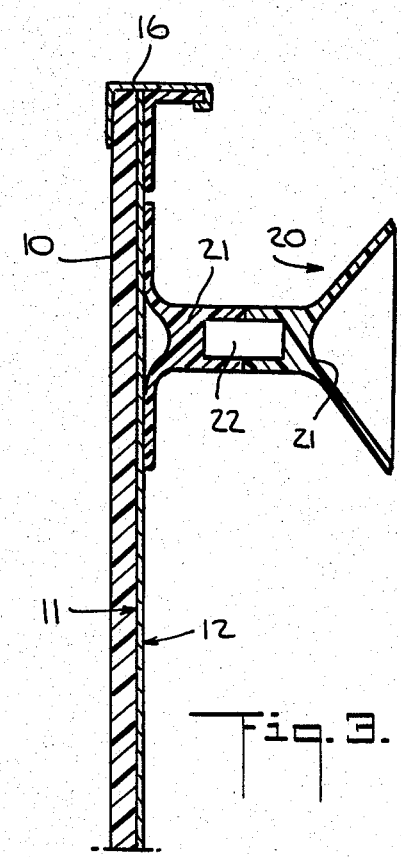
FIG. 3 is a side, cross-sectional view of a preferred embodiment of the invention.

The preferred embodiment of the invention consists of a rectangular sheet 10 of a clear plastic material which is flexible and resistant to breakage due to normal impacts, such as from droppage. The rear surface 11 of the sheet is coated with a reflective material 12 in order to make the sheet into a mirror.

The sheet is mounted in a frame 15 composed of four side members 16-19. The side members are fitted about the sheet and abutting ends of the side members are joined together at each corner of the sheet to form the frame. The side members of the frame are also made from a plastic material that is resistant to breakage, so that the frame and mirror unit is, as a whole, safe for use by a child.

Since the mirror is made of plastic, designs can be applied to the front surface of the mirror in order to increase the attractiveness of the finished product or to serve some identification or informative function.

Attached to the rear surface 11 of the mirror are several mounting devices 20. Each device consists of two suction cups 21 joined to each other by a dowel piece shaft 22 so that the cups face in opposite directions. One of the cups is then permanently attached to the rear surface 11. The second cup can then be used, in cooperation with the other wall-mounting devices to attach the mirror to a wall. The character of the devices allows the mirror to be attached to a wall at any level or in any orientation. They also permit the easy removal of the mirror from the wall, so that it can be moved to a new mounting position in another part of the same room or in another room.

In a preferred embodiment, four such devices are attached to the mirror, one being mounted near each corner of the rectangularly-shaped mirror. It is, of course, possible to use different number of such devices or a different placement of them. The mirror can also be of different shapes.

What is claimed is:

1. A portable mirror comprised of a sheet of clear, impact resistant plastic, a reflective material which is applied to one side of the said sheet in order to form a mirrored surface, a frame to enclose the sheet, and a multiplicity of mounting devices attached to the rear surface of the mirror sheet, each of the mounting devices further comprising a pair of oppositely facing suction cups joined together by a dowel piece, one suction up of each pair being permanently attached to a second side of said sheet.

2. A portable mirror according to claim 1 wherein the sheet is of rectangular shape.

3. A portable mirror according to claim 2, wherein there are four mounting devices attached to the rear surface of the sheet with one device being positioned at each of the corners of the said sheet.

* * * * *

UNITED STATES PATENT AND TRADEMARK OFFICE
CERTIFICATE OF CORRECTION

PATENT NO. : 4,529,278

DATED : July 16, 1985

INVENTOR(S) : Robert T. Nugent

It is certified that error appears in the above-identified patent and that said Letters Patent is hereby corrected as shown below:

Abstract, line 4, --place is-- should be corrected to --place, is--.

Abstract, line 5, --damage, so-- should be corrected to --damage so--.

Column 1, line 24, --missles-- should be corrected to --missiles--.

Column 1, line 41, --handle is-- should be changed to --handle, is--.

Column 2, line 50, --suction up-- shôuld be corrected to --suction cup--.

Signed and Sealed this

Fourth Day of February 1986

[SEAL]

Attest:

DONALD J. QUIGG

Attesting Officer

Commissioner of Patents and Trademarks